US006305182B1

United States Patent
Gupte et al.

(10) Patent No.: US 6,305,182 B1
(45) Date of Patent: Oct. 23, 2001

(54) ABSORPTION HEATING AND COOLING SYSTEM HAVING AN IMPROVED REFRIGERANT CONTROL APPARATUS

(75) Inventors: Neelkanth Shridhar Gupte, Liverpool, NY (US); Deog Yong Song, Seoul; Shik Moon, Uijungbu, both of (KR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/491,667

(22) Filed: Jan. 27, 2000

(51) Int. Cl.[7] ................................................ F25B 13/00
(52) U.S. Cl. ........................ 62/324.2; 62/141; 62/103; 62/476
(58) Field of Search .......................... 62/141, 103, 476, 62/324.2

(56) References Cited

U.S. PATENT DOCUMENTS

| 3,225,556 | * | 12/1965 | Rohrs | 62/141 |
|---|---|---|---|---|
| 3,452,552 | * | 7/1969 | Johnson | 62/141 |
| 3,604,216 | * | 9/1971 | Porter | 62/141 |
| 3,651,655 | * | 3/1972 | Dyre | 62/103 |
| 4,348,868 | * | 9/1982 | Foster et al. | 62/101 |
| 5,592,825 | * | 1/1997 | Inoue | 62/141 |
| 5,617,733 | * | 4/1997 | Tomita et al. | 62/324.2 |
| 5,806,325 | | 9/1998 | Furukawa et al. | |
| 6,009,714 | * | 1/2000 | Tanaka et al. | 62/141 |
| 6,062,038 | * | 5/2000 | Ishiguro et al. | 62/476 |

FOREIGN PATENT DOCUMENTS 4-47226   8/1992 (JP).

* cited by examiner

Primary Examiner—William Doerrler
Assistant Examiner—Mark S. Shulman
(74) Attorney, Agent, or Firm—Wall Marjama & Bilinski

(57) ABSTRACT

A refrigerant control apparatus for use in an absorption heating and cooling system of the type which uses a refrigerant and an absorbent, and which includes a generator, a condenser, an absorber and an evaporator having an evaporator sump. The control apparatus includes a reservoir, disposed in condensate collecting relationship to the condenser, and in refrigerant draining relationship to the evaporator. The reservoir has a storage capacity sufficient to store, during operation in the cooling mode, a quantity of refrigerant large enough to reduce the steady state concentration of the operating solution from a first, relatively high concentration used in the cooling mode to a second, relatively low concentration used the heating mode, and includes an overflow structure that allows refrigerant to overflow into the evaporator when the reservoir is filled. A valve controllably establishes a fluidic path between the reservoir and the evaporator sump when the system is switched from operation in its cooling mode to operation in its heating mode.

13 Claims, 5 Drawing Sheets

ABSORPTION HEATING AND COOLING SYSTEM HAVING AN IMPROVED REFRIGERANT CONTROL APPARATUS

BACKGROUND OF THE INVENTION

This invention relates to absorption heating and cooling systems and, in particular, to a refrigerant control apparatus for facilitating the conversion of such systems from operation in a cooling mode to operation in a heating mode.

As is well known, in an absorption heating and cooling system, a refrigerant is initially brought together with an absorbent capable of holding a high concentration of refrigerant to produce a solution suitable for use in the process. Under operating conditions that vary, the amount of refrigerant necessary to keep the system running efficiently will also vary. During operation in the cooling mode, the concentration of refrigerant is preferably relatively low, i.e., the solution is preferably relatively strong. Under this condition, the factors that limit the concentration of the refrigerant are the need to prevent cavitation from occurring in the refrigerant pump of the evaporator or crystals of absorbent from forming in the sump of the absorber. As a result, it is a common practice to equip the system with a cooling mode refrigerant adjusting system which includes a storage reservoir that is able to store enough refrigerant to prevent the solution from becoming too strong, and to store refrigerant in or release refrigerant from this reservoir as necessary to keep the concentration of the solution within acceptable limits as the demand for cooling fluctuates over the range of conditions over which the system is designed to operate. This storage reservoir often takes the form of a sump located within the system condenser. Since the range of refrigerant concentrations necessary to accommodate this range of conditions is relatively small, the storage capacity which this sump must have in order to accommodate this range of conditions is also relatively small.

One example of a cooling mode refrigerant adjusting system of the above-described type is described in unexamined Japanese application 62-178858, which is assigned to Ebara Ltd. of Tokyo, Japan. In the latter application, there is disclosed an absorption machine in which the gravity flow of liquid refrigerant between the system condenser and the system evaporator is controlled in response to certain sensed system related conditions, such as the solution temperature as it is leaving the absorber. A reservoir for liquid refrigerant is provided inside the condenser and the refrigerant is supplied to the evaporator through a first flow path under normal operating conditions. Upon the sensing of an operational condition that demands an increase in the quantity of refrigerant, a second flow path is opened which supplies additional refrigerant from the condenser sump to the evaporator.

Another example of a refrigerant adjusting system is described in copending U.S. patent application Ser. No. 09/244,910, filed Feb. 4, 1999, which is commonly assigned herewith, and which is hereby expressly incorporated by reference herein. In the latter application, there is disclosed an absorption type machine in which refrigerant is stored in a holding tank that is separate from the condenser sump and that is filled via a refrigerant bleed line. The desired refrigerant concentration is then maintained by releasing refrigerant from the holding tank under the control of a microprocessor in response to the sensing of a need for additional refrigerant.

An example of a refrigerant adjusting system that is specially adapted for use in an absorption type refrigerator is described in U.S. Pat. No. 5,806,325 (Furukawa et al). In the latter patent there is described an absorption type refrigerator in which a storage reservoir is formed in the condenser by a dam with an array of holes that allows the rate at which refrigerant is released to vary as a function of the rate at which refrigerant condenses and, consequently, as a function of the cooling load that the refrigerator must support.

During operation in the heating mode, the solution is preferably as weak as the capacity of the system permits. As a result, when an absorption heating and cooling system is switched from operation in its cooling mode to operation in its heating mode, it is desirable to introduce as much additional refrigerant into the system as is possible.

Prior to the present invention, the additional refrigerant necessary to enable the system to operate efficiently in its heating mode was provided in one of two ways. A first of these was to pump the additional refrigerant from a specially provided storage tank. This approach is not cost effective, however, not only because of the cost of providing a storage tank having a suitable capacity, but also because of the cost of providing a pump and pump control circuitry to perform a function that needs to be performed only a relatively small number of times a year.

A second way of providing the additional refrigerant necessary to enable the system to operate efficiently in its heating mode was to release into the system the contents of the refrigerant storage reservoir or tank that is used as a part of its cooling mode refrigerant adjusting system. This approach is not desirable, however, because this reservoir or tank stored only the amount of refrigerant necessary to support the ability of the system to accommodate fluctuating cooling loads. This approach is also not desirable because it may direct the refrigerant through the spray head of the evaporator, and thereby introduces into the system a restriction which serves little purpose when the system is operating in its heating mode.

In view of the foregoing, it will be seen that, prior to the present invention, there existed a need for a simple, inexpensive, and low loss way of releasing into to and removing from an absorption type heating and cooling system the refrigerant necessary to switch the system between operation in its heating and cooling modes.

SUMMARY OF THE INVENTION

In accordance with the present invention there is provided an improved refrigerant control apparatus that provides a simple, inexpensive and low loss way of adding to and removing from an absorption type heating and cooling system the refrigerant necessary to switch the system between operation in its heating and cooling modes.

Generally speaking, the present invention contemplates the provision, in association with the condenser, of a refrigerant reservoir having a storage capacity sufficient to store, during operation in the cooling mode, a quantity of refrigerant that is large enough to decrease the steady-state concentration of the refrigerant-absorbent solution from a first concentration high enough to enable the system to operate efficiently in its cooling mode to a second concentration low enough to the enable the system to operate efficiently in its heating mode, e.g., by reducing the boiling point of the solution. The present invention also contemplates an overflow structure, such as a dam, standpipe or the like, that allows refrigerant to flow out of the reservoir when the quantity of liquid stored in the reservoir exceeds the storage capacity thereof. Finally, the present invention contemplates a flow control device, such as valve, which is disposed in bypass relationship to the overflow structure and which allows the refrigerant stored in the reservoir to flow into the evaporator when the system is to be switched from operating in its cooling mode to its heating mode. The latter valve is preferably, although not necessarily, manually operated.

In accordance with an important feature of the invention, the above-mentioned decrease in concentration may be significantly larger than that which can be achieved by releasing into the system the entire contents of condenser sumps of the type used in cooling mode refrigerant adjusting systems. This large decrease is important not only because it increases the operating efficiency of the system during operation in its heating mode, but also because it improves the reliability of the solution pump and lowers the rate of corrosion in the high temperature generator.

When the valve is in its closed state, the refrigerant stored in the refrigerant reservoir is effectively withheld from the solution. Under this condition, the solution has a first, relatively high concentration and the system operates in its cooling mode. When the valve is switched to its open state, the refrigerant in the reservoir is released into the evaporator and quickly disperses itself throughout the system. Under this condition, the solution has a second, relatively low concentration and the system operates in its heating mode. When the valve is switched back to its closed state, refrigerant gradually refills the reservoir and causes the concentration of the solution to return to its first value. Accordingly, the system may be switched between operation in its cooling mode and operation in its heating mode by simply opening and closing the valve of the invention.

In all preferred embodiments, the refrigerant reservoir of the invention is located above the evaporator sump, thereby assuring that refrigerant may flow from the reservoir to the evaporator sump without being pumped thereto, i.e., under the force of gravity. In a first embodiment, the refrigerant reservoir is located in the condenser, and may comprise the sump thereof. If desired, however, the refrigerant reservoir of the invention may comprise a tank that is separate from the condenser, provided that it is positioned to fill with refrigerant condensing within the condenser without being pumped, and to empty into the evaporator without being pumped.

Advantageously, the simplicity of the refrigerant control apparatus of the invention allows it to be applied to absorption heating and cooling systems of all widely used types. It may, for example, be applied to heating and cooling systems which use either a series or parallel absorption cycle. It may also be applied to heating and cooling systems which use any of a single, double or triple effect absorption cycle.

Significantly, the refrigerant control apparatus of the invention may be used either with or without cooling mode refrigerant adjusting systems of the type contemplated by unexamined Japanese application 62-178858 and the Furukawa patent, among others. In embodiments in which the apparatus of the invention is used with such an adjusting system, the condenser sump may be partitioned into two parts, one of which serves as a part of one of the latter types of cooling mode refrigerant adjusting systems and the other of which serves as a part of the refrigerant control apparatus of the invention. In such embodiments, the desired decrease in heating mode solution concentration can be maximized by releasing into the system the contents of both parts of the condenser sump. In this way the concentration of the absorbent may brought down to a value as low as 50%.

In many situations, however, the refrigerant control apparatus of the invention may be used without any type of cooling mode refrigerant adjusting system. In such embodiments, the need to prevent cavitation in the evaporator and/or crystallization in the absorber is dealt with by providing the evaporator with a sump that has a volume large enough, relative to the total quantity of liquid within the system, to assure that such conditions cannot occur.

BRIEF DESCRIPTION OF THE DRAWINGS

For a better understanding of these and other objects of the invention, reference will be made to the following detailed description of the invention, which is to be read in association with the accompanying drawings, wherein.

DETAILED DESCRIPTION OF THE INVENTION

Figure 1:
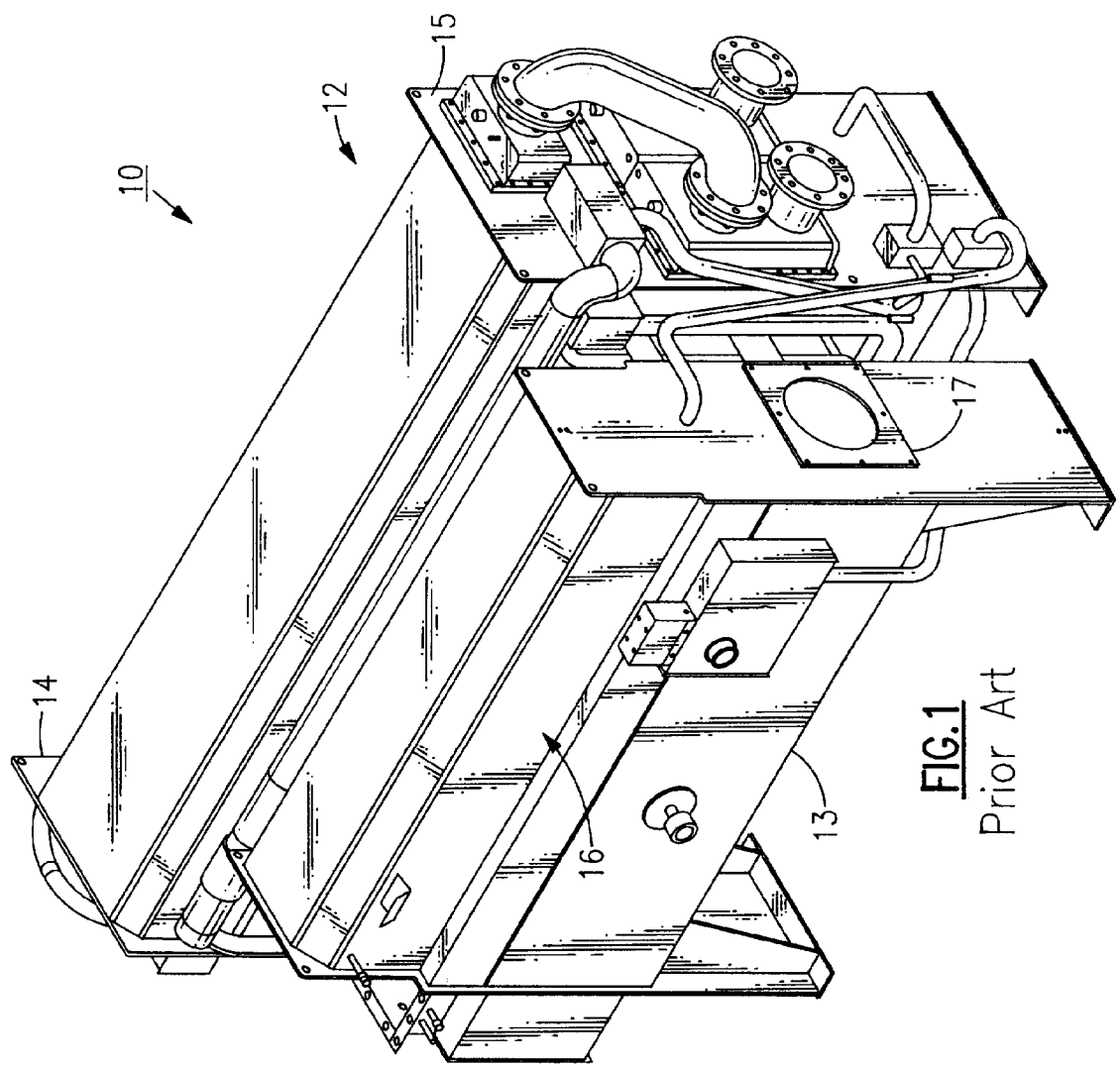
FIG. 1 is a simplified, oblique front view of a multiple-stage absorption heating and cooling system of one type that is suitable for use in practicing the present invention.

Referring initially to FIG. 1, there is shown a simplified, oblique front view of an absorption heating and cooling machine 10 of one of the many types which are known in the art. Machine 10 includes a first main section 12 and a second smaller section 13 that is positioned to one side of the main section. The main section of the machine contains a pair of vertically disposed spaced apart tube sheets 14 and 15 that form parts of the machine's support structure. Second machine section 13 contains a high temperature generator and a burner for heating a solution that is delivered to the generator from the system absorber which is housed in the main section of the machine along with a second low temperature generator, a condenser, an evaporator and a pair of solution heat exchangers. The heat exchanger tubes of the various components are mounted in axial alignment in the two tube sheets and enclosed within suitable leak tight shells welded to the tube sheets.

Figure 2:
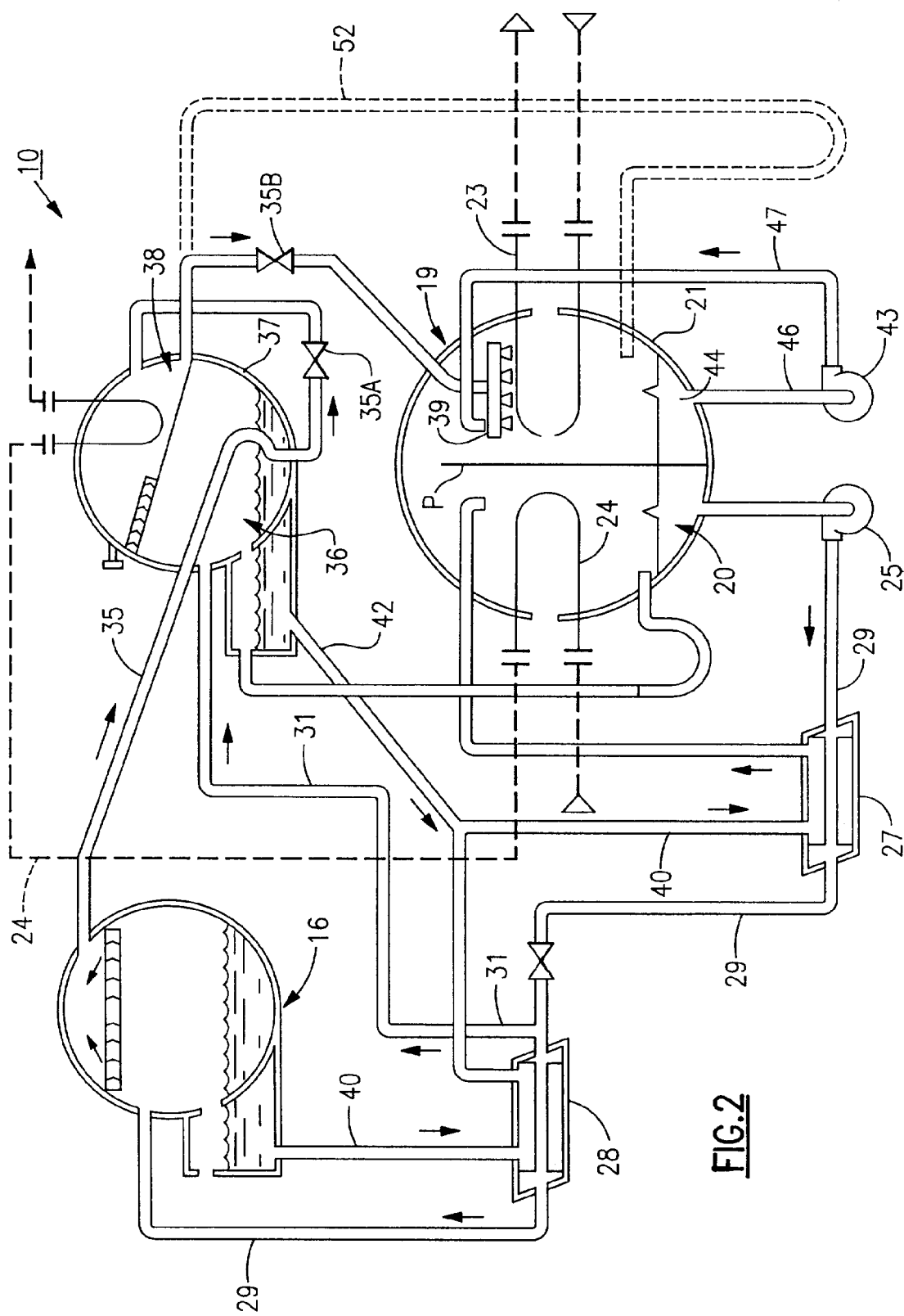
FIG. 2 is a schematic diagram of a system of the type shown in FIG. 1 which does not include a refrigeration control apparatus of the type contemplated by the present invention.

Referring to FIG. 2, there is shown a schematic representation of a known absorption system of one of the types that may be used in machine 10 of FIG. 1, in this case a two-stage parallel cycle solution circuit. Other types of absorption systems may use more or fewer stages, and may use a series rather than a parallel cycle. It will therefore be understood that the absorption system of FIG. 2 comprises a representative one of the many types of absorption systems that might have been selected to provide a descriptive background for the description of the invention. As will be explained more fully later, the refrigerant control apparatus of the invention may be applied to any of these types of heating and cooling systems.

The absorption system of FIG. 2 comprises a closed fluidic system that can operate in either a cooling mode or in a heating mode, depending upon the concentration of the absorbent in the refrigerant-absorbent solution, and on the total quantity of liquid within the system. When the system of FIG. 2 operates in its cooling mode, the solution is preferably has a first, relatively high concentration of the absorbent, i.e., is relatively strong or refrigerant poor, and the total quantity of liquid within the system is relatively small. When the system of FIG. 2 operates in its heating mode, the solution preferably has a second, relatively low concentration of the absorbent, i.e., is weak or refrigerant-rich, and the total quantity of liquid within the system is relatively large. In the following brief description of the operation of the system in these modes, it will be assumed that machine 10 employs water as a refrigerant and lithium bromide, which has a high affinity for water, as an absorbent.

The absorption system shown in FIG. 2 includes an evaporator 19 and an absorber 20 mounted in a side-by-side relationship within a common shell 21. When the system is operating in its cooling mode, liquid refrigerant used in the process is vaporized in the evaporator where it absorbs heat from a fluid, usually water, that is being chilled. The water being chilled is brought through the evaporator by a chilled water line 23. Vaporized refrigerant developed in the evaporator passes to the absorber where it is combined with an absorbent to form a weak solution. Heat developed in the absorption process is taken out of the absorber by means of a water line 24.

The weak solution formed in the absorber is drawn therefrom by means of a solution pump 25. This solution is passed in series through a first low temperature solution heat exchanger 27 and a second high temperature solution heat exchanger 28 by a delivery line 29. As will be explained in greater detail below, the solution is brought into heat transfer relationship with relatively strong solution being returned to the absorber from the two generators employed in the system, thereby raising the temperature of the weak solution as it moves into the generators.

Upon leaving the low temperature solution heat exchanger, a portion of the solution is sent to the low temperature generator 37 via low temperature solution line 31. The remaining solution is sent through the high temperature solution heat exchanger 28 on to the high temperature generator 16 via solution line 29. Although not shown in FIG. 2, the solution in the high temperature generator is heated by the burner to vaporize the refrigerant, and thereby remove it from the solution. The refrigerant vapor produced by high temperature generator 16 passes through vapor line 35, low temperature generator 36, and a suitable expansion valve 35A to condenser 38. Additional refrigerant vapor is added to condenser 38 by low temperature generator 36, which is housed in shell 37 along with the system condenser 38. In the low temperature generator, the weak solution entering from line 31 is heated by the vaporized refrigerant passing through vapor line 35 and added to the refrigerant vapor produced by the high temperature generator. In the condenser, refrigerant vapor from both generators are placed in heat transfer relationship with the cooling water passing through line 24 and condensed into liquid refrigerant.

Refrigerant condensing in the condenser is gravity fed to a spray head 39 located in the top part of evaporator 19 via a condensed refrigerant outlet line 50. On being sprayed into the evaporator, a portion of the refrigerant vaporizes to cool the water flowing through chilled water line 23, and the remainder collects within evaporator sump 44. A refrigerant pump 43 is connected to the sump 44 of evaporator 19 by a suction line 46 and is arranged to return liquid refrigerant collected in the sump back to spray head 39 via supply line 47. Evaporator 19 may also be designed so that condensed refrigerant is routed directly to sump 44 via a suitable J-tube 52 (shown in dotted lines) and bypasses spray head 39, In systems which use evaporators of the latter type, all of the refrigerant sprayed over chilled water line 23 is supplied by refrigerant pump 43 via line 47.

Strong absorbent solution flows from the two generators back to the absorber to be reused in the absorption cycle. On its return, the strong solution from the high temperature generator is passed through the high temperature solution heat exchanger 28 and then through the second low temperature solution heat exchanger 27 via solution return line 40. Strong solution leaving the low temperature generator is connected into the solution return line by means of a feeder line 42 which enters the return line at the entrance of the second solution heat exchanger.

In heating and cooling systems which use cooling mode refrigerant adjusting systems of the type described in unexamined Japanese application 62-17885, and in U.S. Pat. No. 5,806,325 (Furukawa et al), the condenser shown in FIG. 2 is provided with a condenser sump (not shown) that is located near the point where condenser 38 is connected to condensed refrigerant outlet line 50. This condenser sump is designed to store a quantity of liquid refrigerant which is just sufficient to allow the concentration of the solution to be adjusted as necessary to assure optimum operating efficiency under conditions in which the cooling load on the system fluctuates with time. Such adjustments are accomplished by draining additional refrigerant from the condenser sump to the evaporator sump, via a controllable valve and specially provided drain line (not shown), in response to a system variable such as the temperature of the solution at the outlet of the absorber. When the quantity of condensed refrigerant in the condenser exceeds the capacity of this condenser sump, the condenser sump overflows into refrigerant outlet line 50 (or 52) and is supplied to the evaporator in the manner described above. Since adjusting systems of this type are described in detail in the above-cited references, they will not be further discussed herein.

The heating and cooling system shown in FIG. 2 may also operate in a heating mode, if the quantity of refrigerant in the system as a whole is increased by the amount necessary to cause the refrigerant in evaporator 19 to rise to a level sufficient to overflow partition P and flow into absorber 20. This is because, under the latter condition, condensed refrigerant flowing into evaporator 19 does not vaporize and, therefore, does not therefore absorb heat from the liquid flowing through line 23. Instead, hot, freshly condensed refrigerant transfers heat to the water flowing through line 23 by direct conduction and thereby makes that heat available to the space to be heated. Heat which the system transfers to the water flowing through line 24 may also be transferred to the space to be heated. It will therefore be seen that the system shown in FIG. 2 is able to either cool or heat the space to be heated, depending on whether the solution used therein is refrigerant-poor, i.e., has a first, relatively high concentration of the absorbent, or refrigerant-rich, i.e., has a second, relatively low concentration of the absorbent). As a result, the system can be converted from operation in its cooling mode to operation in its heating mode, and back again, by adding to or withdrawing from the system the quantity of refrigerant that corresponds to the difference between these concentrations, and making appropriate changes in the connections of lines 23 and 24.

Prior to the present invention, the quantity of refrigerant necessary to convert the system from operation in its cooling mode to operation in its heating mode was added to the system by pumping it from a stand alone storage tank having a suitable storage capacity, or by drawing that quantity from water mains. Conversely, the quantity of refrigerant necessary to convert the system back to operation in its cooling mode was withdrawn from some suitable point in the system, such as condenser 38, and either stored or discarded. In both cases, the concentration of the solution in the system, as measured at any convenient point, such as the outlet of absorber 20, would vary for a time, but eventually settle down to a steady state value appropriate for the mode in which the system was to operate.

As will now be explained with reference to FIGS. 3 through 5, the present invention comprises a refrigerant control apparatus that provides a new, simple and inexpensive way of adding to and withdrawing from a heating and cooling system of the representative type described in connection with FIG. 2 the quantity of refrigerant necessary to convert that system from operation in its heating mode to operation in its heating mode, and back again.

Figure 3:
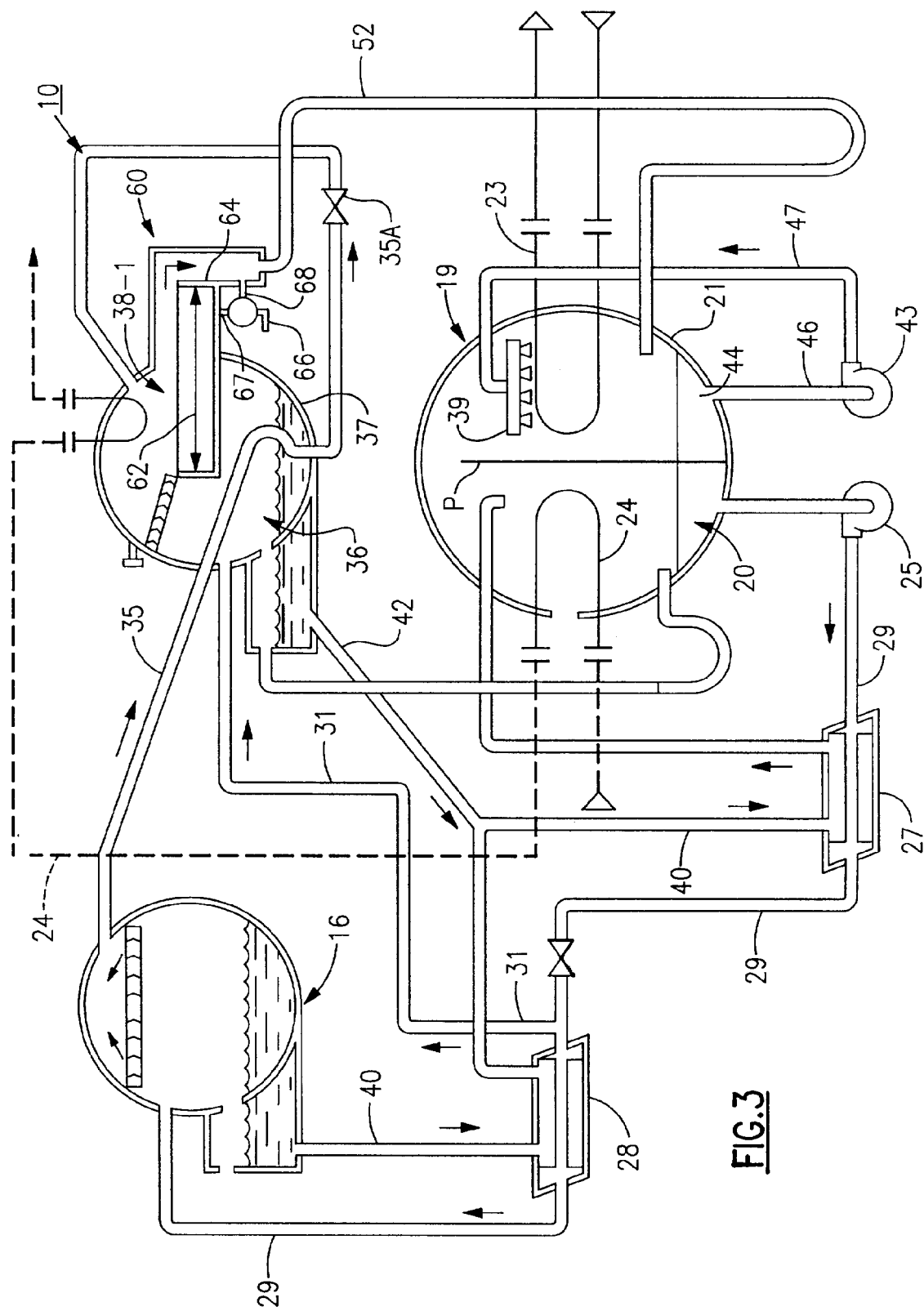
FIG. 3 is a schematic diagram of a system of the type shown in FIG. 1 which has been modified to include a refrigeration control apparatus of the type contemplated by the present invention.
Figure 4:
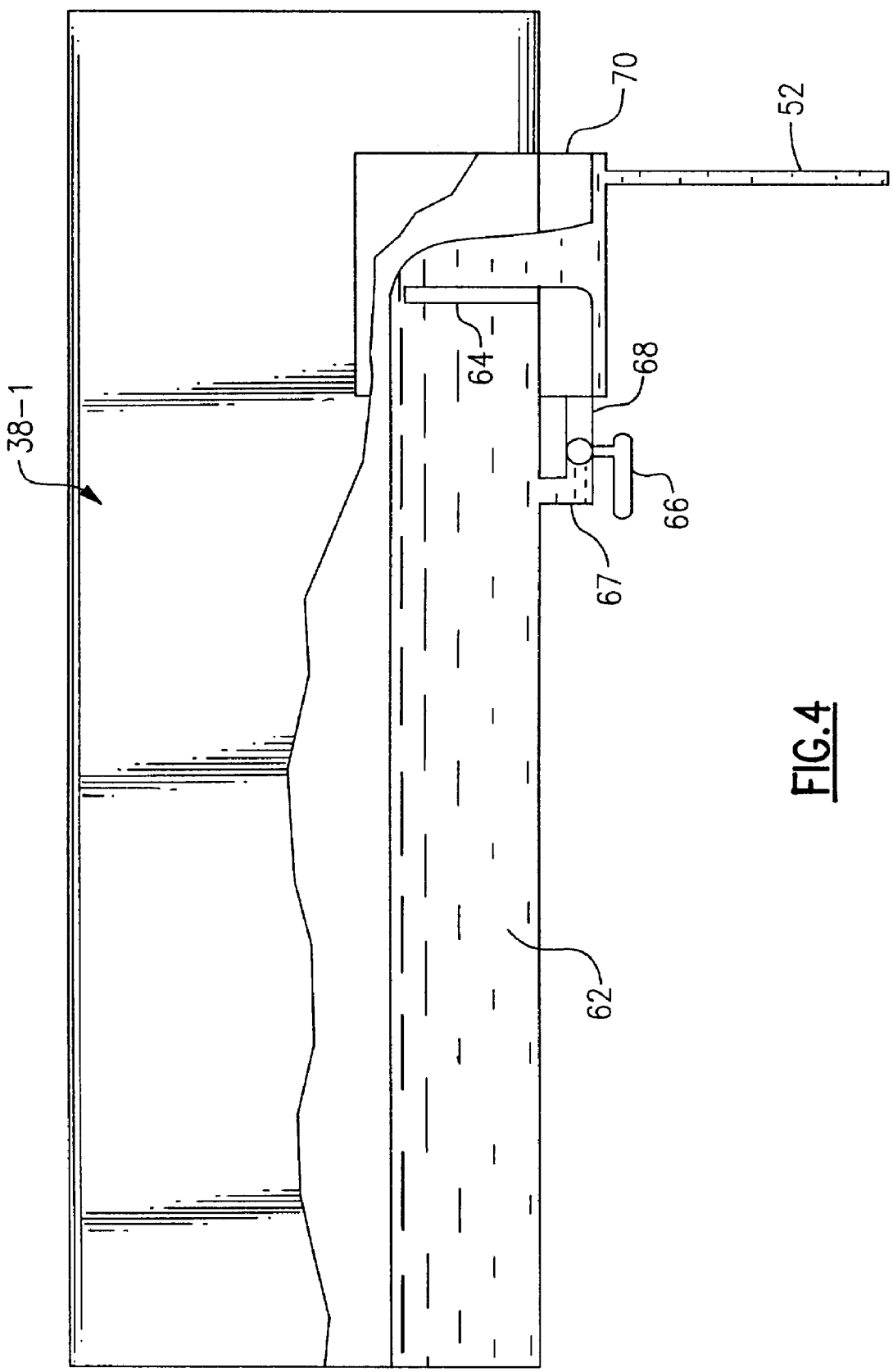
FIG. 4 is a simplified, cutaway rear view of the condenser shown in FIG. 3.

Referring to FIG. 3, there is shown a heating and cooling system of the type described in connection with FIG. 2 which has been modified to include one embodiment of the present invention. The system shown in FIG. 3 is generally similar to that shown in FIG. 2, like functioning parts being similarly numbered, except that the system shown in FIG. 3 includes a refrigerant control apparatus 60 which is disposed in condensate collecting relationship to the condenser 38-1, and in condensate draining relationship to evaporator 19, In accordance with the present invention, refrigerant control apparatus 60 includes a reservoir 62 having a storage capacity sufficient to store, during operation in the cooling mode, a quantity of liquid refrigerant large enough that, if released into heating and cooling system 10, it would reduce the steady state concentration of the solution therein from its first or cooling mode concentration to its second or heating mode concentration. Refrigerant control apparatus 60 also includes an overflow structure 64, which may comprise a dam, standpipe or the like, that allows liquid refrigerant to flow out of reservoir 62 when the quantity of refrigerant in that reservoir exceeds the storage capacity thereof. Finally, refrigerant control apparatus 60 includes a valve 66 through which refrigerant in reservoir 62 may be transferred from reservoir 62 to evaporator 19 when the heating and cooling system is switched from operation in its cooling mode to operation in its heating mode.

When the system of FIG. 3 operates in its cooling mode, valve 66 is closed. Under this condition reservoir 62 remains full, thereby withholding from the system enough refrigerant for the system to operate at the relatively high absorbent concentration that assures efficient operation in that mode. When the system operates in its heating mode, valve 66 is open. Under this condition, reservoir 62 remains virtually empty, thereby keeping in circulation within the system enough refrigerant for the system to operate at the relatively low absorbent concentration that assures efficient operation in that mode. When, after being open, valve 66 is once again closed, condensed refrigerant will accumulate within reservoir 62 until there is withdrawn from the system enough refrigerant to restore the relatively high absorbent concentration that is desirable for operation in the cooling mode. It will therefore be seen that, by opening and closing valve 66, the system of FIG. 3 may be switched from operation in its cooling mode to operation in its heating mode, and back again, without using pumps, pump switches, float valves, etc. of the type used prior to the present invention.

Reservoir 62 may be located in whole or in part inside of condenser 38-1, as shown schematically in FIG. 3, and take the form of a specially enlarged version of the sump thereof. Embodiments of this type may be constructed without significantly increasing the overall size of the condenser, if the long dimension or longitudinal axis of the reservoir is made to extend along the long dimension or longitudinal axis of the condenser. A condenser sump-reservoir of the latter type is shown in FIG. 4, which comprises a simplified, cutaway rear view of condenser 38-1 in which many of the components, such as the low temperature generator, and much of the piping that are associated with the condenser have been omitted for the sake of clarity. In the embodiment of FIG. 4, it will be seen that reservoir 62 extends along much of the length of condenser 38-1, and has a capacity that is defined by the lower surfaces of condenser 38-1 and dam 64. As will be apparent to those skilled in the art, however, it is not important whether dam 64 is disposed perpendicular to the longitudinal axis of the condenser, as shown physically in FIG. 4, or parallel to the longitudinal axis of the condenser, as shown schematically in FIG. 3.

Reservoir 62 may also be located in a separate tank (not shown) which is located below condenser 38-1, but above evaporator 19, thereby assuring that liquid refrigerant may be gravity-fed both from the condenser to the tank and from the tank to the evaporator. Because of the additional cost of providing such a separate tank, embodiments of this type are not preferred embodiments of the present invention.

As is most clearly shown in FIG. 4, valve 66 is located below reservoir 62 and is connected in bypass or parallel relationship to dam 64 via refrigerant lines 67 and 68. The location of valve 66 below reservoir 62 assures that reservoir 62 can be fully emptied when the system is switched from operation in its cooling mode to operation in its heating mode. The parallel relationship between dam 64 and valve 66 assures that refrigerant can flow to the evaporator, via line 52, both when valve 66 is closed and when valve 66 is open. A box 70 that extends outwardly from the surface of condenser 38-1 serves as a convenient way of combining the flows over dam 64 and through valve 66 so that both flows can reach the evaporator via line 52. If desired, however, box 70 may be eliminated, and the flows over dam 64 and through valve 66 directed to the evaporator through separate respective lines. Because of the additional expense of providing such separate lines, embodiments which use such separate lines are not preferred embodiments of the invention.

While the refrigerant control apparatus of the invention has been described with reference to a two-stage, parallel cycle absorption heating and cooling system, it could just as well have been described with reference to heating and cooling machines of any of a variety of other types, including a single-stage, series cycle system, among others. This is because systems of all types are differentiated from one another largely by the numbers of their generators and heat exchangers and by the ways in which the latter are connected to one another and to the absorber, and not by the way in which their condensers are connected to their evaporators. Since it is the latter connections that are important for purposes of the present invention, it will be seen that the refrigerant control apparatus of the invention may be applied to all of these systems, without regard to the numbers of their stages or the kinds of cycles used therein. Accordingly, in order to avoid needless repetition, the application of the invention to these other types of systems will not be specifically described herein. It will nevertheless be understood that such systems are within the contemplation of the present invention.

Figure 5:
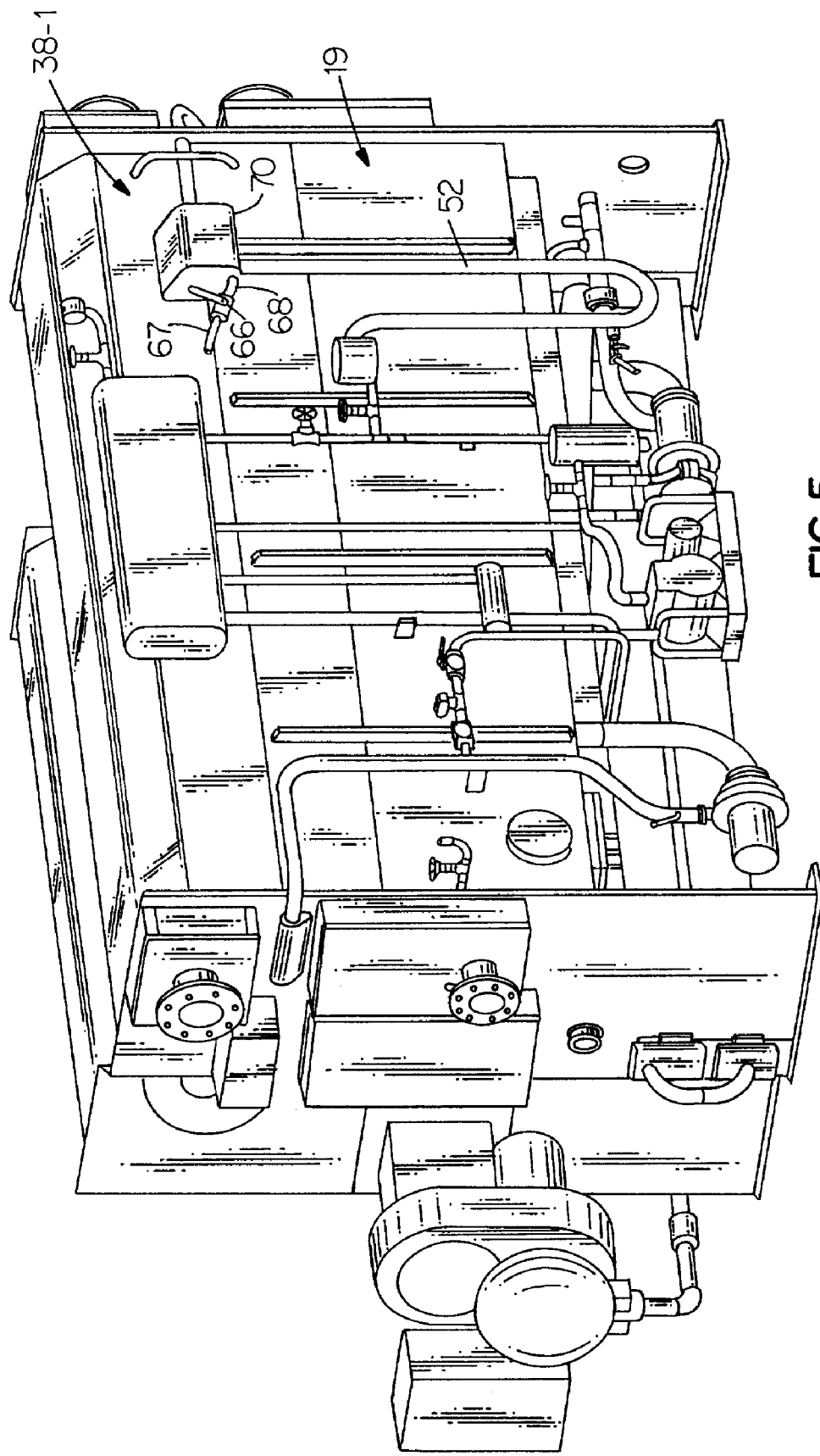
FIG. 5 is a simplified, oblique rear view of a heating and cooling system which includes a refrigeration control apparatus of the type contemplated by the present invention.

Referring to FIG. 5, there is shown a simplified rear external view of the preferred embodiment of an absorption based heating and cooling machine which is equipped with the refrigerant control apparatus of the present invention. The embodiment of FIG. 5 comprises a model 16DN direct fired absorption chiller manufactured by Carrier Corporation. Because the operation of the system of FIG. 5 will be apparent to those skilled in the art from the foregoing description of FIG. 3, the system of FIG. 5 will not be discussed in detail herein.

In accordance with an important feature of the refrigerant control apparatus of the invention, it may be used either with or without a cooling mode refrigerant adjusting system of the type described in unexamined Japanese application 62-178858, and in U.S. Pat. No. 5,806,325 (Furukawa et al). Whether the refrigerant control apparatus of the invention is used with or without such a refrigerant adjusting system depends whether evaporator sump 44 has a volume, relative to the total quantity of liquid within the system as a whole, that is large enough to allow the system to operate without cavitation occurring in the evaporator or crystallization occurring in the absorber. If the evaporator sump has a relatively small volume, it is desirable to use the refrigerant control apparatus of the invention with a refrigerant adjusting system in order to assure that refrigerant can be added as necessary to prevent cavitation and/or crystallization from occurring during operation in the cooling mode. In this case, the system condenser is preferably designed to include both a reservoir of the type contemplated by the present invention, and a condenser sump of the type described in the above-referenced application and patent, and to allow the former to overflow into the latter. In such a system, the condenser sump and reservoir are preferably arranged so that each can release refrigerant independently of the other.

If, on the other hand, the evaporator sump has a relatively large volume in relation to the total quantity of liquid within the system as a whole, the refrigerant control apparatus of the invention may be used without a refrigerant adjusting system of the type described in the above-referenced application and patent. This is because, in such a system, the fluctuations in solution concentration that are associated with fluctuations in the cooling load on the system are accommodated automatically by changes in the level of the refrigerant within the sump of the evaporator. Embodiments of the invention which have refrigerant reservoirs and evaporator sumps that are properly sized in relation to one another may, therefore, be constructed incurring the expense of providing the valves, sensors and controllers used in cooling mode refrigerant adjusting systems of the type described in the above-cited application and patent. As a result, embodiments of this type are preferred embodiments of the present invention.

While the present invention has been described with reference to certain specific embodiments, it will be understood that these embodiments are exemplary only, and that the true spirit and scope of the present invention should be determined with reference to the following claims.

We claim:

1. In an absorption heating and cooling system of the type which uses a refrigerant and an absorbent and which includes a generator, a condenser, an absorber and an evaporator having an evaporator sump and a heat exchanger that carries a flow of a fluid to be heated or cooled, said apparatus firer including means for connecting said generator, condenser, evaporator and absorber to one another to form a closed fluidic system and being adapted to switchably operate in either a cooling mode in which the fluid flowing through said heat exchanger is cooled and in which a refrigerant-absorbent solution flowing out of said absorber has a first, relatively high concentration of said absorbent, or in a heating mode in which the fluid flowing through said heat exchanger is heated and in which the refrigerant-absorbent solution flowing out of said absorber preferably has a second, relatively low concentration of said absorbent, an improved refrigerant control apparatus comprising:

a reservoir associated with said condenser for collecting liquid refrigerant condensing within said condenser, said reservoir having a storage capacity sufficient to store, during operation in said cooling mode, a quantity of liquid refrigerant large enough to reduce the steady-state concentration of said solution from said first concentration to said second concentration, and an overflow structure that allows liquid refrigerant to flow out of said reservoir when the quantity of liquid refrigerant in said reservoir exceeds the storage capacity thereof; and valve means for controllably establishing a fluidic path between said reservoir and said evaporator sump when a said system is switched from operation in said cooling mode to operation in said heating mode.

2. The absorption heating and cooling system of claim 1 in which the volume of the evaporator sump is large enough, relative to the total quantity of liquid within said system that said system can operate without cavitation occurring during the operation of the evaporator, and without crystallization occurring in the absorber, when said system operates in its cooling mode.

3. The absorption heating and cooling system of claim 1 in which said overflow structure includes a dam located at one end of said reservoir and a pipe, positioned beneath said dam, for directing liquid refrigerant flowing out of said reservoir to said evaporator sump.

4. The absorption heating and cooling system of claim 1 in which said valve means comprises a manually operable valve.

5. The absorption heating and cooling system of claim 1 in which said overflow structure includes a dam located at one end of said reservoir and a pipe, positioned beneath said dam, for directing liquid refrigerant flowing out of said reservoir to said evaporator sump, and in which said valve means comprises a valve connected in bypass relationship to said dam.

6. The absorption heating and cooling system of claim 1 in which the volume of the evaporator sump is large enough, relative to the total quantity of liquid within said system, that said system can operate without cavitation occurring during the operation of the evaporator, and without crystallization occurring in the absorber, when said system operates in its cooling mode, in which said overflow structure includes a dam located at one end of said reservoir and a pipe, positioned beneath said dam, for directing liquid refrigerant flowing out of said reservoir to said evaporator sump, and in which said valve means comprises a valve connected in bypass relationship to said dam.

7. The absorption heating and cooling system of claim 1 wherein said reservoir is located within said condenser.

8. In an absorption heating and cooling system of the type which uses a refrigerant and an absorbent and which includes a generator, a condenser, an absorber and an evaporator having an evaporator sump and a heat exchanger that carries a flow of a fluid to be heated or cooled, said apparatus further including means for connecting said generator, condenser, evaporator and absorber to one another to form a closed fluidic system and being adapted to switchably operate in either a cooling mode in which the fluid flowing through said heat exchanger is cooled and in which a refrigerant-absorbent solution flowing out of said absorber has a first, relatively high concentration of said absorbent, or in a heating mode in which the fluid flowing through said heat exchanger is heated and in which the refrigerant-absorbent solution flowing out of said absorber preferably has a second, relatively low concentration of said absorbent, an improved refrigerant control apparatus comprising:

a condenser sump in said condenser for collecting liquid refrigerant condensing within said condenser, said condenser sump having a storage capacity sufficient to store, during operation in said cooling mode, a quantity of liquid refrigerant which, if released from said condenser sump, would cause the concentration of said solution to fall from said first concentration to said second concentration, and outlet means for limiting the amount of liquid refrigerant within the condenser sump to said quantity; and a refrigerant valve trough which liquid refrigerant stored in said condenser sump may be transferred to said evaporator sump when a said system is switched from operation in said cooling mode to operation in said heating mode.

9. The absorption heating and cooling system of claim 8 in which the volume of the evaporator sump is large enough, relative to the total quantity of liquid within said system, that said system can operate without cavitation occurring during the operation of the evaporator, and without crystallization occurring in the absorber, when said system operates in its cooling mode.

10. The absorption heating and cooling system of claim 8 in which said outlet means comprises a dam located at one end of said condenser sump and a pipe, positioned beneath said dam, for directing liquid refrigerant flowing out of said condenser sump to said evaporator sump.

11. The absorption heating and cooling system of claim 8 in which said refrigerant valve comprises a manually operable valve.

12. The absorption heating and cooling system of claim 8 in which said outlet means includes a dam located at one end of said condenser sump and a pipe, positioned beneath said dam, for directing liquid refrigerant flowing out of said reservoir to said evaporator sump, and in which said refrigerant valve is connected in bypass relationship to said dam.

13. The absorption heating and cooling system of claim 8 in which the volume of the evaporator sump is large enough, relative to the total quantity of liquid within said system, that said system can operate without cavitation occurring during the operation of the evaporator, and without crystallization occurring in the absorber, when said system operates in its cooling mode, in which said outlet means includes a dam located at one end of said condenser sump and a pipe, positioned beneath said dam, for directing liquid refrigerant flowing out of said condenser sump to said evaporator sump, and in which said refrigerant valve is connected in bypass relationship to said dam.

* * * * *